United States Patent Office 3,663,502
Patented May 16, 1972

---

3,663,502
TERTIARY PHOSPHINE OXIDE-AMMONIUM POLYPHOSPHATE COMBINATIONS AS FLAME-RETARDANTS FOR PROPYLENE POLYMERS
Robert William Murray, Lebanon, and Christos Savides, Piscataway, N.J., assignors to American Cyanamid Company, Stamford, Conn.
No Drawing. Filed Oct. 29, 1970, Ser. No. 85,307
Int. Cl. C08f 45/04, 45/60; C09k 3/28
U.S. Cl. 260—41
11 Claims

ABSTRACT OF THE DISCLOSURE

Flame-retardant compositions comprising (A) a phosphine oxide having the formula

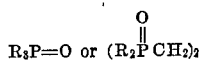

$$R_3P=O \text{ or } (R_2PCH_2)_2$$

wherein R is 2-cyanoethyl, 2-carbamoylethyl or 2-(N-alkylcarbamoyl)ethyl and (B) ammonium polyphosphate and propylene polymers containing said compositions, are disclosed.

BACKGROUND OF THE INVENTION

The production of resin compositions which are flame-retardant is of considerable commercial importance in that such articles as castings, moldings, laminated articles, etc. are required, or at least desired, to be resistant to fire and flame and to possess the ability to endure heat without deterioration. Typical illustrations of applications of such compositions include castings for live electrical contacts which should not be ignited by flame or sparks, structural members such as pipes, wall coverings, wall paneling, windows, etc. and such items as ash trays, waste baskets, fibers and the like.

The use of certain additives for the purpose of reducing the flammability of various thermoplastic polymers is well known to those skilled in the art. Among the additives currently employed for such a use are various specific types of phosphine oxide compounds. These phosporus compounds are generally used either alone (U.S. 3,341,625 and 3,284,543) or in combination with other materials such as chlorinated hydrocarbons (U.S. 3,370,030) or 2,3-dicarboxy-5,8-endomethylene-5,6,7,8,9,9-hexachloro - 1,2, 3,4,4a,5,8,8a-octahydronaphthalene anhydride and its esters (U.S. 3,532,668).

SUMMARY

We have now found that excellent flame-retarding properties can be imparted to propylene polymers by incorporating into the polymer a synergistic combination or mixture of (A) a phosphine oxide having the formula (I) $\qquad R_3P=O$ wherein R is 2-cyanoethyl, 2-carbamoylethyl or 2-(N-alkylcarbamoyl)ethyl, or the formula (II)
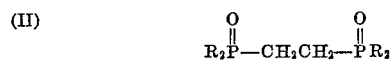
$$R_2\overset{O}{\overset{\|}{P}}-CH_2CH_2-\overset{O}{\overset{\|}{P}}R_2$$

wherein R is as defined above, and (B) ammonium polyphosphate.

The novel synergistic combination of phosphine oxide and ammonium polyphosphate provides improved flame-retardance over additives of the prior art and, additionally, generally provide this superior result at lower concentrations than previously believed necessary for known additives. The results shown by the use of the above-disclosed novel flame-retardant combinations are surprising and unexpected in that the combinations provide a greater degree of flame-retardancy than one would expect from the results shown by the use of the components individually, i.e. they are synergistic.

DESCRIPTION OF THE INVENTION INCLUDING PREFERRED EMBODIMENTS

As mentioned above, the first critical component of our novel flame-retardant compositions is a compound represented by either Formula I or Formula II, above. These compounds are generally well known in the art, as are methods for their preparation, as represented by U.S. Pat. Nos. 3,067,258; 3,099,684; 3,032,589 and those set forth hereinabove, which patents are hereby incorporated herein by reference.

The second critical component of our novel flame-retardant compositions is an ammonium polyphosphate. These compounds are also well known in the art as exemplified by U.S. Pat. Nos. 3,423,343 and 3,513,114, which patents are also hereby incorporated herein by reference. These ammonium polyphosphates are generally substantially water-insoluble and possess a plurality of P—O—P type linkages. They can be represented by the formula (III) $\qquad H_{(n-m)+2}(NH_4)_mP_nO_{3n+1}$ wherein $n$ is an integer having an average value greater than 10, $m/n$ is between about 0.7 and about 1.1 and the maximum value of $m$ is equal to $n+2$. They are straight or branched chain structures having nearly all the nitrogen present therein as ammonical nitrogen. The average numerical value of $n$, using end group titration after acid formation, is from about 20–400, while using the light scattering method, the average weight value of $n$ is above about 500, preferably 500–100,000 and especially preferably 1000–30,000. The ammonium polyphosphates exhibit different crystalline forms but are also found in the non-crystalline or amorphous form also.

The combination of phosphine oxide and ammonium polyphosphate is useful as a flame-retardant when incorporated into propylene polymers in a flame-retarding amount, i.e. at least about 5%, by weight, preferably from about 5% to about 25%, by weight, based on the weight of the polymer. The ratio of phosphine oxide to ammonium polyphosphate should range from about 2:1 to about 1:2, respectively.

The propylene polymers rendered flame-retardant by the incorporation therein of our novel combination include the homopolymer of propylene and copolymers of propylene and olefin comonomers which possess from 2–4 carbon atoms, inclusive, such as ethylene, butylene, isobutylene etc.; the copolymers containing 50–90% of propylene, by weight.

The novel flame-retardant combinations claimed herein may be added to the various propylene polymers, as such, or as individual components, by any known method. That is to say, the flame-retardant components may be added to the polymer, as such, or in combination by (1) milling the polymer and the components on, for example, a two-roll mill, in a Banbury mixer, etc. by (2) molding the components and the polymer simultaneously, by (3) extruding the polymer and components or by (4) merely blending all the materials together in powder or liquid form and thereafter forming the desired ultimate product. Additionally, the flame-retardant components or combination may be added during the production of the polymer, i.e. during the monomer polymerization, provided, however, that the catalyst, etc. other conditions and other ingredients of the polymerization system are inert thereto.

It is also within the scope of the instant invention to incorporate such ingredients as plasticizers, dyes, pigments, heat and light stabilizers, antioxidants, antistatic agents, photochromic materials and the like into the flame-retarded propylene polymer compositions claimed herein.

The following examples are set forth for purposes of illustration only and are not to be construed as limitations on the present invention except as set forth in the appended claims. All parts and percentages are by weight unless otherwise specified. In the examples, the additives, in the concentrations indicated, were either (1) dry blended with the propylene polymer, extruded at 420° F. and chopped into pellets and then injection molded at 400–450° F. into bars 5" x 0.5" x 0.25" or (2) dry blended with the propylene polymer and extruded through the orifice of a melt-index apparatus (described in ASTM-D-1238-65T) at 250° C. into a 5–7" cylindrical extrudate. The flammability of the injection molded bars was measured according to ASTM-D-635 or Underwriters Laboratory Test UL-94 while that of the extruded cylinders was measured using a modified ASTM-D-635 method as described in the above-mentioned patents. The ammonium polyphosphate used was a commercially available material having a phosphorus weight percent of 32 and an ammonical nitrogen to phosphorus molar ratio of 0.92. The results are set forth in Table I, below.

The metal oxides or carbonates are added to the propylene polymer in an amount ranging from about 0.5% to about 5%, by weight, based on the weight of the polymer. The manner in which the metal oxide or carbonate is added is not critical and it can be added to the polymer before, along with or after the phosphine oxide-ammonium polyphosphate combination. Amounts higher than about 5% are generally undesirable since they appear to cause the propylene polymer to burn more readily, behaving as if there was no flame-retardant present.

It is not completely understood why these metal oxides or carbonates function within relatively narrow limits to prevent dripping of the propylene polymer on burning and we do not wish to be held to any particular theory in this regard. Nevertheless, we have found that alkali metal carbonates such as sodium carbonate, potassium carbonate etc.; alkaline earth metal oxides such as barium oxide, magnesium oxide, etc.; alkaline earth metal carbonates such as magnesium carbonate, calcium carbonate etc.; Group IV-A metal oxides such as silicon dioxide, stannic

TABLE I

| Ex. | Phosphine oxide Formula No. | R | Percent | Percent ammonium polyphosphate | Propylene polymer | Flammability test used | Flammability rating |
|---|---|---|---|---|---|---|---|
| 1 | I | 2-(N-t-butyl carbamoyl)ethyl | 10 | | Polypropylene | Modified ASTM-D-635 | Free-burning |
| 2 | I | do | 5 | 5 | do | do | Self-extinguishing |
| 3 | | | | 20 | do | ASTM-D-635 | Free-burning |
| 4 | I | 2-cyanoethyl | 5 | | do | Modified ASTM-D-635 | Do. |
| 5 | I | do | 2.5 | 2.5 | do | do | Self-extinguishing |
| 6 | II | do | 5 | | do | do | Free-burning |
| 7 | II | do | 2.5 | 2.5 | do | do | Self-extinguishing |
| 8 | I | 2-carbamoylethyl | 5 | | do | do | Free-burning |
| 9 | I | do | 2.5 | 2.5 | do | do | Self-extinguishing |
| 10 | | | | 10 | do | do | Free-burning |
| 11 | I | 2-(N-methylcarbamoyl)ethyl | 10 | | do | do | Do. |
| 12 | I | do | 5 | 5 | do | do | Self-extinguishing |
| 13 | II | 2-(N-propylcarbamoyl)ethyl | 10 | | do | do | Free-burning |
| 14 | II | do | 5 | 5 | do | do | Self-extinguishing |
| 15 | | | | 10 | do | do | Free-burning |
| 16 | II | 2-carbamoylethyl | 10 | | Ethylene-propylene copolymer (20/80) | do | Do. |
| 17 | II | do | 5 | 5 | do | do | Self-extinguishing |
| 18 | | | | 10 | do | do | Free-burning |

In addition to the superior results exhibited above by the synergistic combination of the phosphine oxide and ammonium polyphosphate, we have also discovered that these unique combinations can be further modified by the incorporation therewith, into propylene polymers, of various metal oxides and/or carbonates. The addition of these oxides etc. results in the production, when the combination is added to propylene polymers, of products which are not only flame-retarded but also rendered non-dripping By "non-dripping" is meant that when the propylene polymer is burned, the material does not drip, either as a burning or a molten mass. This property is rapidly becoming a requirement of plastics which are to be used for various applications such as those mentioned above.

oxide, etc.; titanium dioxide; zinc oxide; aluminum oxide; antimony oxide and the like can be used. While some of the compounds function at low concentrations, e.g. about 0.5% but not at about 5.0%, others perform at the higher level only. In all cases, however, the metal oxides or carbonates function to prevent dripping in a synergistic manner with the flame-retardant combination at a concentration within the above range.

The examples below clearly illustrate the unique effect afforded by the use of the oxide or carbonate in conjunction with the flame-retardant combinations of Examples 1–18, above. The tests used, percentages, manner of incorporation, etc. conform to those enumerated above. The results are set forth in Table II.

TABLE II

| Example | Phosphine oxide-ammonium polyphosphate flame-retarded polymer of example— | Oxide or carbonate | Percent | Flammability test used | Flammability rating |
|---|---|---|---|---|---|
| 19 | No. 9 (10% of each component) | Silicon dioxide | 1.0 | UL-94 | Self-extinguishing and non dripping. |
| 20 | do | do | 2.0 | UL-94 | Do. |
| 21 | do | do | 0.5 | UL-94 | Do. |
| 22 | No. 9 (5% of each component) | do | 1.0 | UL-94 | Do. |
| 23 | No. 9 (10% of each component) | Magnesium oxide | 1.0 | UL-94 | Do. |
| 24 | do | Magnesium carbonate | 1.0 | UL-94 | Do. |
| 25 | do | Aluminum oxide | 4.0 | UL-94 | Do. |
| 26 | do | Stannic oxide | 5.0 | UL-94 | Do. |
| 27 | do | Barium oxide | 1.0 | UL-94 | Do. |
| 28 | do | Zinc oxide | 1.0 | UL-94 | Do. |
| 29 | do | Barium carbonate | 1.0 | UL-94 | Do. |
| 30 | do | Antimony oxide | 1.0 | UL-94 | Do. |
| 31 | do | Titanium dioxide | 1.0 | UL-94 | Do. |
| 32 | 2 | Sodium carbonate | 1.0 | UL-94 | Do. |
| 33 | 5 | Silicon dioxide | 2.0 | UL-94 | Do. |
| 34 | 7 | Titanium dioxide | 2.0 | UL-94 | Do. |
| 35 | 12 | Barium oxide | 1.0 | UL-94 | Do. |
| 36 | 14 | Aluminum oxide | 3.0 | UL-94 | Do. |
| 37 | 17 | Silicon dioxide | 1.5 | UL-94 | Do. |

We claim:

1. A flame-retardant composition comprising (A) a compound having the formula

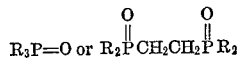

$$R_3P=O \text{ or } R_2\overset{O}{\overset{\|}{P}}CH_2CH_2\overset{O}{\overset{\|}{P}}R_2$$

wherein R is 2-cyanoethyl, 2-carbamoylethyl or 2-(N-alkylcarbamoyl)ethyl and (B) ammonium polyphosphate, the ratio of (A):(B) ranging from about 2:1 to about 1:2, respectively.

2. A composition according to claim 1 wherein (A) is tris(2-carbamoylethyl)phosphine oxide.

3. A composition according to claim 1 wherein (A) is tris(2-cyanoethyl)phosphine oxide.

4. A composition according to claim 1 wherein (A) is tris(2-N-t-butylcarbamoylethyl)phosphine oxide.

5. A flame-retarded composition comprising a propylene polymer having incorporated therein a flame-retarding amount of the composition of claim 1.

6. A composition according to claim 5 wherein said propylene polymer is polypropylene.

7. A composition according to claim 5 wherein said (A) is tris(2-carbamoylethyl)phosphine oxide.

8. A composition according to claim 5 wherein said (A) is tris(2-cyanoethyl)phosphine oxide.

9. A composition according to claim 1 containing, in addition thereto, (C) from about 0.5% to about 5.0%, by weight, based on the weight of the polymer to which the composition is to be added, of a compound selected from the group consisting of (1) alkali metal carbonates, (2) alkaline earth metal carbonates, (3) alkaline earth metal oxides, (4) Group IV–A metal oxides, (5) titanium dioxide, (6) zinc oxide, (7) aluminum oxide and (8) antimony oxide.

10. A composition according to claim 9 wherein (C) is silicon dioxide.

11. A flame-retarded composition comprising a propylene polymer having incorporated therein a flame-retarding amount of the composition of claim 9.

References Cited

UNITED STATES PATENTS 3,562,197    2/1971    Sears et al. _____ 252—8.1

MORRIS LIEBMAN, Primary Examiner

J. H. DERRINGTON, Assistant Examiner

U.S. Cl. X.R.

106—15 FP; 252—8.1; 260—45.75, 45.9 R